(12) United States Patent
Seo et al.

(10) Patent No.: US 9,415,576 B2
(45) Date of Patent: Aug. 16, 2016

(54) DISPLAY DEVICE AND METHOD OF MANUFACTURING THE SAME

(71) Applicant: SAMSUNG DISPLAY CO., LTD., Yongin, Gyeonggi-Do (KR)

(72) Inventors: Gwang Jea Seo, Cheonan-si (KR); Dong Suk Choi, Suwon-si (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 42 days.

(21) Appl. No.: 14/287,929

(22) Filed: May 27, 2014

(65) Prior Publication Data

US 2015/0208521 A1 Jul. 23, 2015

(30) Foreign Application Priority Data

Jan. 22, 2014 (KR) ........................ 10-2014-0007801

(51) Int. Cl.
| | |
|---|---|
| *H05K 7/00* | (2006.01) |
| *B32B 38/00* | (2006.01) |
| *B32B 37/12* | (2006.01) |
| *G06F 3/041* | (2006.01) |

(52) U.S. Cl.
CPC ......... *B32B 38/0008* (2013.01); *B32B 37/1284* (2013.01); *B32B 2037/1253* (2013.01); *B32B 2305/022* (2013.01); *B32B 2310/08* (2013.01); *B32B 2457/20* (2013.01); *G06F 3/041* (2013.01); *G06F 2203/04103* (2013.01); *Y10T 156/10* (2015.01)

(58) Field of Classification Search
USPC .................................. 361/746, 807, 809, 810
See application file for complete search history.

(56) References Cited

U.S. PATENT DOCUMENTS

| | | | |
|---|---|---|---|
| 4,004,388 A | 1/1977 | Stefanik | |
| 8,711,320 B2 * | 4/2014 | Arai | G02F 1/13452 200/600 |
| 2011/0134378 A1 * | 6/2011 | Tsuboi | G02F 1/133512 349/110 |
| 2012/0127091 A1 * | 5/2012 | Kim | G02F 1/13338 345/173 |
| 2012/0235048 A1 * | 9/2012 | Kim | G02F 1/133308 250/372 |
| 2012/0314176 A1 * | 12/2012 | Tsuchiya | G02F 1/1339 349/153 |
| 2015/0070602 A1 * | 3/2015 | Fujita | G02F 1/13338 349/12 |

FOREIGN PATENT DOCUMENTS

| | | |
|---|---|---|
| JP | 2010-085453 A | 4/2010 |
| KR | 10-2011-0123534 A | 11/2011 |
| KR | 10-2012-0054275 A | 5/2012 |

* cited by examiner

*Primary Examiner* — Hung S Bui
(74) *Attorney, Agent, or Firm* — Lee & Morse, P.C.

(57) ABSTRACT

A display device and a method of manufacturing the same, the display device including a display module including a display area and a circuit area; a window that faces the display module; a bonding member between the display area of the display module and the window, the bonding member bonding the display module and the window together; and a dam member along a boundary between the display area and the circuit area, the dam member separating the bonding member and the circuit area, wherein the dam member includes a foam element that absorbs at least a portion of the bonding member.

20 Claims, 14 Drawing Sheets

DISPLAY DEVICE AND METHOD OF MANUFACTURING THE SAME

CROSS-REFERENCE TO RELATED APPLICATION

Korean Patent Application No. 10-2014-0007801, filed on Jan. 22, 2014, in the Korean Intellectual Property Office, and entitled: "Display Device And Method Of Manufacturing The Same," is incorporated by reference herein in its entirety.

BACKGROUND

1. Field

Embodiments relate to a display device and a method of manufacturing the same.

2. Description of the Related Art

With the development of information society, various display panels may be being applied to display devices. The display panels may include organic light-emitting device (OLED) panels, liquid crystal display (LCD) panels, electrophoretic display (EPD) panels, and electrowetting display (EWD) panels.

SUMMARY

Embodiments are directed to a display device and a method of manufacturing the same.

The embodiments may be realized by providing a display device including a display module including a display area and a circuit area; a window that faces the display module; a bonding member between the display area of the display module and the window, the bonding member bonding the display module and the window together; and a dam member along a boundary between the display area and the circuit area, the dam member separating the bonding member and the circuit area, wherein the dam member includes a foam element that absorbs at least a portion of the bonding member.

The display device may further include an integrated circuit (IC) chip in the circuit area.

The dam member may cover at least a portion of the IC chip.

The display module may include a first substrate and a second substrate, the second substrate overlying a portion of the first substrate in the display area, and the IC chip may be on a portion of the first substrate in the circuit area.

The display device may further include a connecting member, the connecting member having a side that is connected to the display module.

The dam member may cover the side of the connecting member.

The display module may include a display panel and a touch panel, the touch panel being on the display panel, and the side of the connecting member may be connected to the touch panel.

The connecting member may include a flexible printed circuit board.

The dam member may be attached to a surface of the window that faces the display module.

The dam member may be between the display module and the window, and the dam member may extend along side surfaces of the bonding member.

The bonding member may include a photocurable resin.

The foam element may include at least one of a polypropylene-based resin, a polyacrylic-based resin, a polyurethane-based resin, or a polyolefin-based resin.

The embodiments may be realized by providing a method of manufacturing a display device, the method including providing a display module that includes a display area and a circuit area; forming a dam member on a portion of a surface of a window such that the dam member extends along a boundary between the display area and the circuit area; bonding the window and the display module together with a bonding member; and curing the bonding member, wherein the dam member includes a foam element that absorbs at least a portion of the bonding member.

Forming the dam member may include attaching the foam element to a tape and attaching the tape having the foam element thereon onto the surface of the window at the boundary between the display area and the circuit area.

Forming the dam member may include attaching the tape to edges of the surface of the window.

Bonding the window and the display module may include coating a space on the surface of the window with the bonding member, the space being formed by the surface of the window and the dam member; placing the display module such that the display module faces the surface of the window and the bonding member; and pressing the display module toward the window.

Bonding the window and the display module may include coating the bonding member on the display area of the display module; placing the window such that the surface of the window faces the display module and the bonding member; and pressing the window toward the display module.

The bonding member may include a photocurable resin.

Curing the bonding member may include irradiating ultraviolet light to the bonding member.

The foam element may include at least one of a polypropylene-based resin, a polyacrylic-based resin, a polyurethane-based resin, or a polyolefin-based resin.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
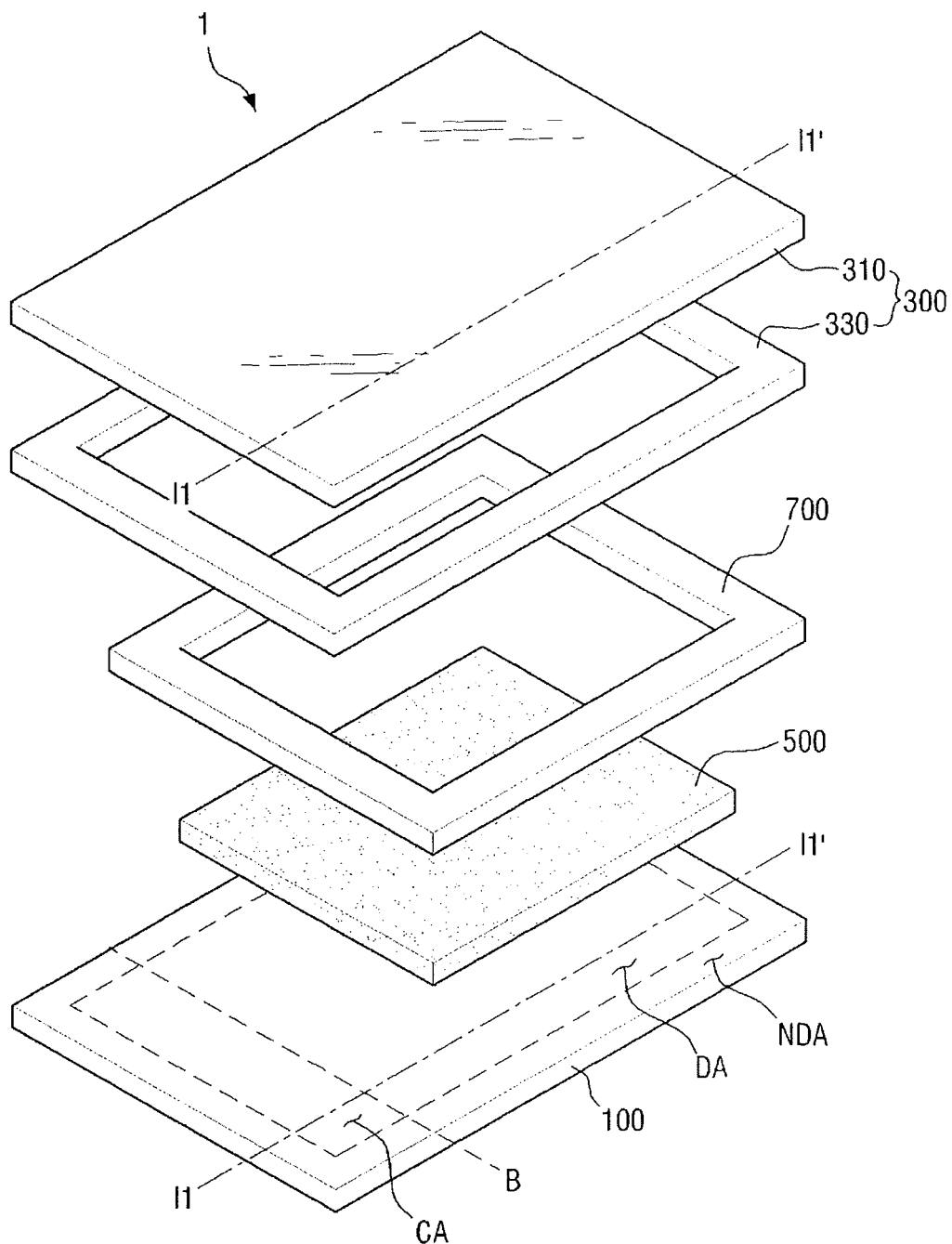
FIG. 1 illustrates a schematic exploded perspective view of a display device according to an embodiment.

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

It will be understood that when an element or layer is referred to as being "on" another element or layer, it can be directly on the other element or layer or intervening elements or layers may be present.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Like reference numerals refer to like elements throughout the specification.

Embodiments are described herein with reference to plan and cross-section illustrations that are schematic illustrations of idealized embodiments of the invention. As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope.

It will be understood that, although the terms first, second, third, etc., may be used herein to describe various elements, these elements should not be limited by these terms. These terms are only used to distinguish one element from another element. Thus, a first element discussed below could be termed a second element without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value, considering the measurement in question and the error associated with measurement of the particular quantity (i.e., the limitations of the measurement system). For example, the term, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 2:
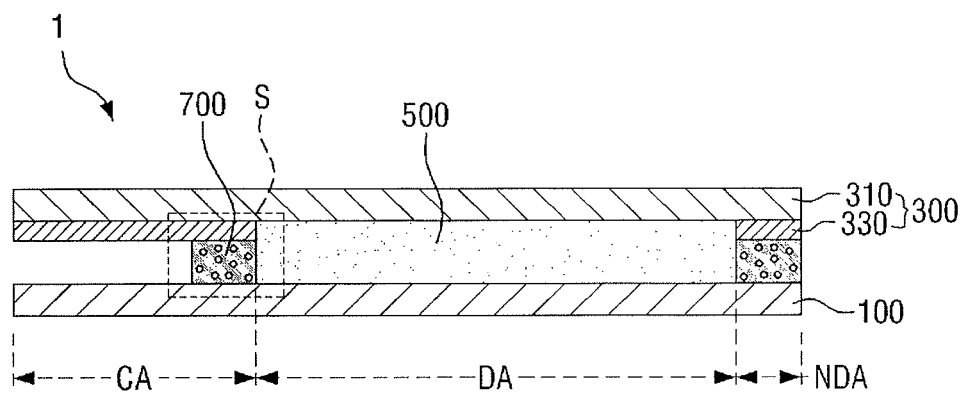
FIG. 2 illustrates a cross-sectional view of the display device taken along the line I1-I1' of FIG. 1.
Figure 3:
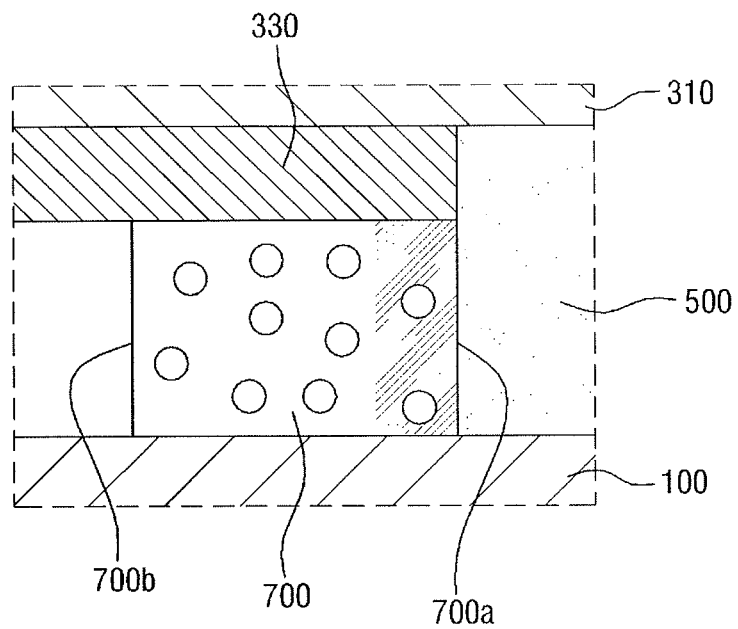
FIG. 3 illustrates an enlarged cross-sectional view of a portion S of FIG. 2.

FIG. 1 illustrates a schematic exploded perspective view of a display device 1 according to an embodiment. FIG. 2 illustrates a cross-sectional view of the display device 1 taken along the line I1-I1' of FIG. 1. FIG. 3 illustrates an enlarged cross-sectional view of a portion S of FIG. 2.

Referring to FIGS. 1 through 3, the display device 1 according to the current embodiment may include a display module 100, a window 300, a bonding member 500, and a dam member 700.

The display module 100 may include a display panel (not shown) that displays an image. In an implementation, the display panel may be a self-luminous display panel such as an organic light-emitting device (OLED) panel. In an implementation, the display panel may be a non-luminous display panel such as a liquid crystal display (LCD) panel, an electrophoretic display (EPD) panel, or an electrowetting display (EWD) panel. In a case where a non-luminous display panel is used as the display panel, the display module 100 may further include a backlight unit that supplies light to the display panel.

The display module 100 may have a substantially rectangular planar shape. In an implementation, the display module 100 may include a display area DA (that displays an image) and a non-display area NDA (that does not display an image). A lower portion of the non-display area NDA of the display module 100 based on FIG. 1 may include a circuit area CA.

The window 300 may be on the display module 100. For example, the window 300 may be located in a direction in which an image is output from the display module 100 and may face the display module 100. The window 300 may include a window body 310 and a light-blocking member 330.

The window body 310 may be made of a transparent material, e.g., glass or polymer plastic. The window body 310 may help prevent damage to the display module 100 by, e.g., external impact, and may help protect the display module 100.

The window body 310 may be on or overlie the display module 100 to face the display module 100, and may cover the display area DA and the non-display area NDA of the display module 100. The window body 310 may be attached to the display module 100 via the bonding member 500 that is between the display module 100 and the window 300. The window body 310 may help protect the display module 100, together with the bonding member 500, thereby improving impact resistance of the display device 1. In an implementation, the window body 310 may be larger than the display module 100. In an implementation, the window body 310 may have substantially the same size as the display module 100.

The light-blocking member 330 may have a shape corresponding to or the same as the non-display area NDA of the display module 100, and may cover the non-display area NDA of the display module 100. For example, the light-blocking member 330 may overlie the non-display area NDA (and the circuit area CA) of the display module 100. The light-blocking member 330 may help prevent the non-display area NDA of the display module 100 from being seen from the outside. The light-blocking member 330 may include a light-absorbing material or a light-blocking material. In an implementation, the light-blocking member 330 may include a metal material having low reflectivity, e.g., chromium (Cr) or molybdenum (Mo). In an implementation, the light-blocking member 330 may include an opaque inorganic insulating material, e.g., CrOx or MoOx. In an implementation, the light-blocking member 330 may include an opaque organic insulating material, e.g., carbon black.

The bonding member 500 may be between the window 300 and the display module 100. For example, the bonding member 500 may be between the display area DA of the display module 100 and the window 300. In an implementation, a portion of the bonding member 500 may be between the non-display area NDA of the display module 100 and the window 300.

The bonding member 500 may be between the display module 100 and the window 300, and formation of an air gap between the display module 100 and the window 300 may be reduced and/or prevented. In addition, introduction of foreign matter (e.g., dust) between the display module 100 and the window 300 may be reduced and/or prevented. By preventing the formation of the air gap and the introduction of foreign matter, it is also possible to help prevent the distortion of an image displayed on the display module 100.

The bonding member 500 may bond the display module 100 and the window 300 together. The bonding member 500 may help protect the display module 100 together with the window 300, thereby improving the impact resistance of the display device 1.

The bonding member 500 may include a resin. For example, the bonding member 500 may be formed by forming resin (having fluidity) between the display module 100 and the window 300, and then curing the resin. Therefore, the bonding member 500, before being cured, may have fluidity. In an implementation, the bonding member 500 may include resin having high light transmittance. The resin may be, e.g., an optically clear resin (OCR). In an implementation, the bonding member 500 may be made of or may include, e.g., a material having an equal or similar optical refractive index to that of the window body 310, in order to help maintain its optical characteristics even after the window 300 is attached thereto. In an implementation, the bonding member 500 may be made of or may include a photocurale resin (e.g., an ultraviolet (UV) curable resin). In an implementation, the bonding member 500 may be made of or may include a thermosetting resin.

The dam member 700 may be between the window 300 and the display module 100. The dam member 700 may be or may extend along a boundary between the display area DA and the circuit area CA. As illustrated in the drawings, the dam member 700 may be overlap or overlie the circuit area CA. For example, an inner edge of the dam member 700 may be aligned with the boundary between the display area DA and the circuit area CA. In an implementation, a portion of the dam member 700 may also overlap or overlie at least a portion of the display area DA. The dam member 700 may be or may extend along the boundary between the display area DA and the circuit area CA, and the dam member 700 may help reduce the likelihood of and/or prevent the bonding member 500 (having fluidity) from flowing from the display area DA to the circuit area CA.

The dam member 700 may surround four side surfaces of the bonding member 500. For example, the dam member 700 may be placed or may extend along the side surfaces of the bonding member 500. The dam member 700 may serve as a barrier that helps prevent a portion of the bonding member 500 from flowing to the outside (or the periphery) of the display device 1 in the process of forming the bonding member 500 or in the process of bonding the display module 100 and the window 300.

Although not illustrated in the drawings, in an implementation, the dam member 700 may be placed or may extend only at the boundary between the display area DA and the circuit area CA. For example, the dam member 700 may be shaped like one long stripe that is substantially parallel with a lower side surface or one end of the display module 100. In this case, the dam member 700 may have a substantially equal length to a length of the lower side surface or the one end of the display panel 100.

If the dam member 700 is placed or extends along the boundary between the display area DA and the circuit area CA as described above, the circuit area CA may be completely isolated from the display area DA. Consequently, the bonding member 500 (placed to correspond to or overlying the display area DA) may not flow to the circuit area CA, even before being cured, because it may be blocked by the dam member 700.

The dam member 700 may include a foam element having a porous structure or a sponge-like structure. The dam member 700 may absorb part of the bonding member 500 before the bonding member 500 is cured. Accordingly, even if an excess of resin were to be supplied to form the bonding member 500, the dam member 700 may absorb (or may take in) part of the resin, and overflowing of the bonding member 500 may be more effectively reduced and/or prevented. In an implementation, the dam member 700 may include the foam element, and may function as a buffer. Therefore, the dam member 700 may help more effectively protect the display module 100 from external impact. The dam member 700 (including the foam element) may be compressed by a certain rate. Accordingly, the dam member 700 may be attached more firmly to the display module 100, thereby more effectively reducing and/or preventing the bonding member 500 from flowing to the circuit area CA.

As described above, the dam member 700 may absorb part of the bonding member 500 before being cured or part of resin that forms the bonding member 500. In an implementation, a first side 700a of the dam member 700 may contact the bonding member 500. In an implementation, a density of the resin (or a density of the bonding member 500) at the first side 700a of the dam member 700 may be relatively higher than a density of the resin (or a density of the bonding member 500) at a second side 700b of the dam member 700. For example, a greater amount of the resin may be absorbed by the dam member 700 at the first side 700a thereof (e.g., adjacent to the bonding member 500) than may be absorbed by the dam member 700 at the second side 700b thereof (e.g., distal to the bonding member 500).

The material that forms the foam element may be or may include, e.g., at least one of an acrylic-based resin (such as poly(methyl methacrylate) or poly(ethyl methacrylate)); a polyester-based resin (such as polyethylene terephthalate, polyethylene isophthalate, polyethylene naphthalate, or polybutylene terephthalate); a cellulose-based resin (such as diacetyl cellulose or triacetyl cellulose); or a polyolefin-based resin (such as polyethylene, polypropylene, polyolefin having cyclo or norbornene structure, or ethylene-propylene copolymer). In an implementation, the material that forms the foam element may include polypropylene. Polypropylene may have a high permanent compression rate (e.g., a rate at which polypropylene remains compressed without returning to its original state after being compressed), and the dam member 700 (made of or including polypropylene) may help reduce the likelihood of and/or prevent the window 300 and the display module 100 from being lifted by its repulsive force.

In an implementation, the dam member 700 may be made of a light-transmitting material. In an implementation, the dam member 700 may be made of a light-blocking material.

The dam member 700 may be provided in the form of a foam tape. For example, the dam member 700 may be structured such that the foam element is on one surface of a base film, and an adhesive layer is on another surface of the base film. In an implementation, the dam member 700 may include the foam element and the adhesive layer or tape directly thereon.

The dam member 700 may be attached to a surface of the window 300 that faces the display module 100. In an implementation, if formed as the foam tape, the dam member 700 may be attached to edges of the surface of the window 300 that faces the display module 100. Using the foam tape, the dam member 700 may be formed to a uniform height, by a simple process, and at a reduced material cost.

Figure 4:
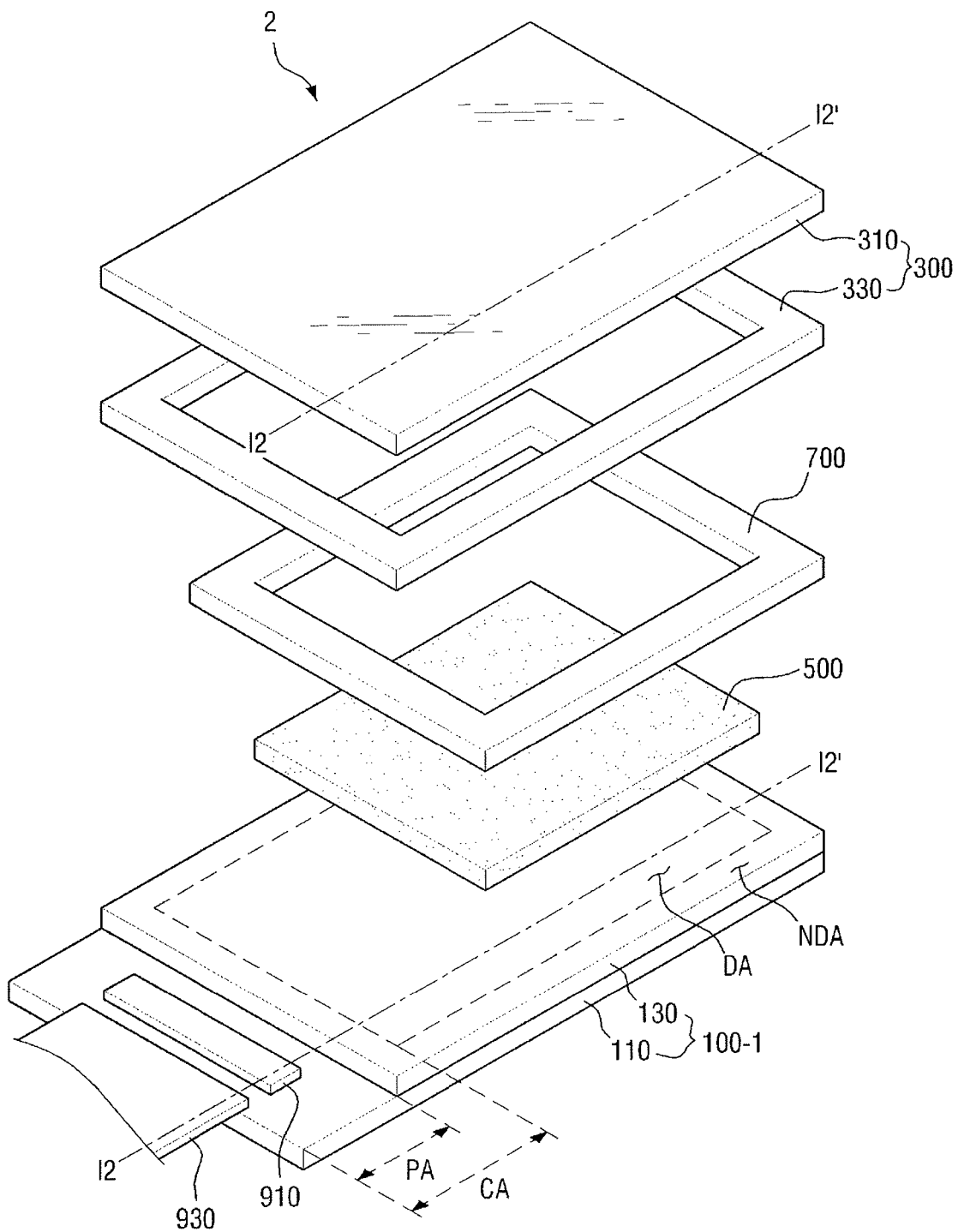
FIG. 4 illustrates a schematic exploded perspective view of a display device according to another embodiment.
Figure 5:
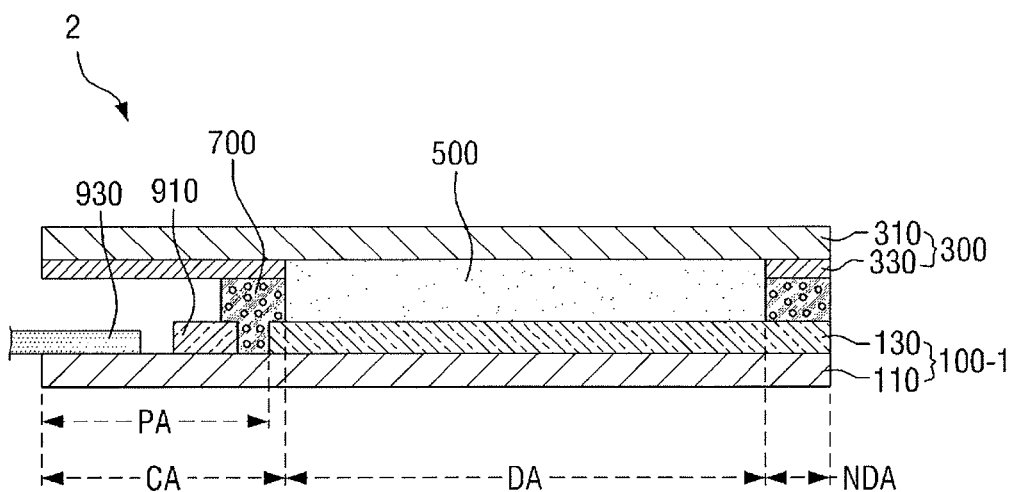
FIG. 5 illustrates a cross-sectional view of the display device taken along the line I2-I2' of FIG. 4.

FIG. 4 illustrates a schematic exploded perspective view of a display device 2 according to another embodiment. FIG. 5 illustrates a cross-sectional view of the display device 2 taken along the line I2-I2' of FIG. 4.

Referring to FIGS. 4 and 5, the display device 2 according to the current embodiment may include a display module 100-1 (that includes a first substrate 110 and a second substrate 130), a window 300, a bonding member 500, a dam member 700 and an integrated circuit (IC) chip 910, and may further include a chip connecting member 930. For ease of description, a repeated description of elements identical to those of FIGS. 1 through 3 may be given briefly or omitted.

The display module 100-1 may include the first substrate 110 and the second substrate 130 facing each other. If the display module 100-1 includes liquid crystals, the liquid crystals may be located between the first substrate 110 and the second substrate 130. In an implementation, if the display module 100-1 includes an organic light-emitting diode, the organic light-emitting diode may be located between the first substrate 110 and the second substrate 130.

The first substrate 110 may have a first area, and the second substrate 130 may have a second area that is smaller than the first area. The second substrate 130 may have a smaller area than the first substrate 110, and the second substrate 130 may expose a portion of the first substrate 110 that corresponds to a circuit area CA. For example, the first substrate 110 may include an exposed area PA that is not covered by the second substrate 130. The exposed area PA may be a portion of the circuit area CA, as illustrated in the drawings. In an implementation, the exposed area PA may be the whole of the circuit area CA.

The first substrate 110 and the second substrate 130 may be bonded together by a sealant (not shown) along edges of the second substrate 130.

The IC chip 910 may be mounted on the exposed area PA of the first substrate 110. For example, the IC chip 910 may be on a surface of the first substrate 110 that is attached to or faces the second substrate 130. For example, the second substrate 130 and the IC chip 910 may be placed to neighbor, e.g., may be adjacent to, each other. The IC chip 910 may be on the exposed area PA of the first substrate 110 using, e.g., a chip-on-glass (COG) method.

The first substrate 110 may include a plurality of pixels arranged in a matrix in a display area DA. The first substrate 110 may further include a driver (not shown) in the display area DA, the circuit area CA, or the exposed area PA, the driver driving the pixels. The first substrate 110 may further include pad electrodes (not shown) in the exposed area PA. The IC chip 910 may be on the exposed area PA of the first substrate 110 and may be electrically connected to the pad electrodes (not shown). The first substrate 110 may further include a wiring line that connects the IC chip 910 and the driver (not shown).

The chip connecting member 930 may have one side that is connected to the exposed area PA of the first substrate 110 and another side that is connected to a driving circuit (not shown). A driving signal generated by the driving circuit (not shown) may be delivered to the IC chip 910 or the driver (not shown) of the first substrate 110 via the chip connecting member 930. The chip connecting member 930 may be, e.g., a flexible printed circuit board (FPCB).

The window 300 may be on the display module 100-1. The window 300 may include a window body 310 (that faces the second substrate 130 of the display module 100-1) and a light-blocking member 330.

The bonding member 500 may be between the window 300 and the display module 100-1. The bonding member 500 may be between the display area DA of the display module 100-1 and the window 300. In an implementation, a portion of the bonding member 500 may be between a non-display area NDA of the display module 100-1 and the window 300. The bonding member 500 may bond the second substrate 130 of the display module 100-1 and the window 300 together.

The dam member 700 may be between the window 300 and the display module 100-1. The dam member 700 may be placed or may extend along a boundary between the display area DA and the circuit area CA. As illustrated in the drawings, the dam member 700 may overlap or overlie the circuit area CA. In an implementation, a portion of the dam member 700 may also overlap the display area DA. The dam member 700 may be placed or may extend along the boundary between the display area DA and the circuit area CA, and the bonding member 500 having fluidity may be prevented from flowing from the display area DA to the circuit area CA.

The dam member 700 may include a foam element, and thus may be compressed by a certain rate. Accordingly, the dam member 700 may cover a step portion between the first substrate 110 and the second substrate 130. In an implementation, the dam member 700 may cover at least a portion of the IC chip 910 mounted on the exposed area PA of the first substrate 110. In the drawings, the dam member 700 is shown as covering only a portion of the IC chip 910. In an implementation, the dam member 700 may cover the whole of the IC chip 910. Accordingly, it is possible to effectively prevent the bonding member 500 from flowing from the display area DA to the circuit area CA, e.g., to the IC chip 910. Further, the dam member 700 including the foam element may function as a buffer. Thus, the dam member 700 may help protect the IC chip 910 from external impact.

Figure 6:
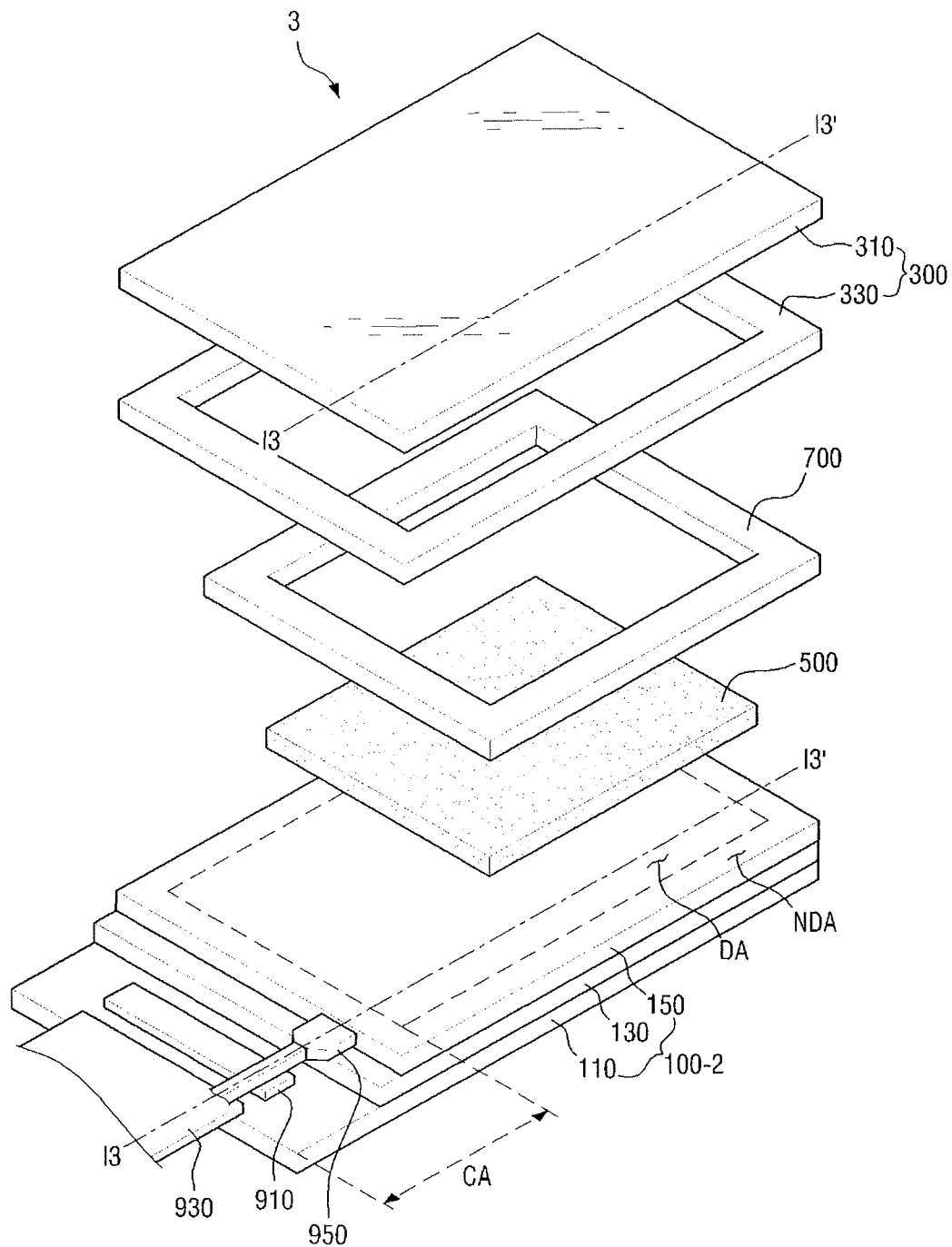
FIG. 6 illustrates a schematic exploded perspective view of a display device according to another embodiment.
Figure 7:
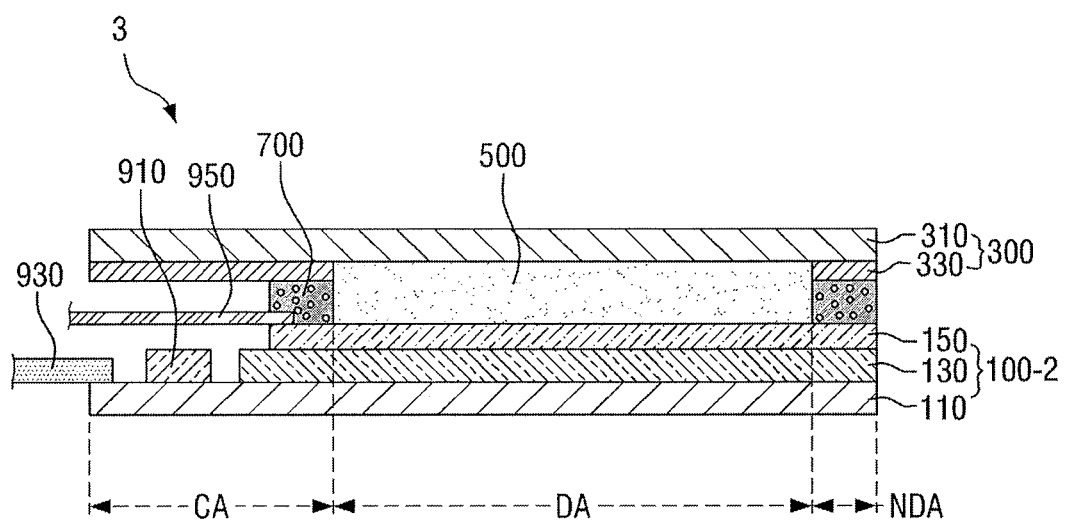
FIG. 7 illustrates a cross-sectional view of the display device taken along the line I3-I3' of FIG. 6.

FIG. 6 illustrates a schematic exploded perspective view of a display device 3 according to another embodiment. FIG. 7 illustrates a cross-sectional view of the display device 3 taken along the line I3-I3' of FIG. 6.

Referring to FIGS. 6 and 7, the display device 3 according to the current embodiment may include a display module 100-2 (that includes a first substrate 110, a second substrate 130, and a touch panel 150), a window 300, a bonding member 500, a dam member 700, and a connecting member 950, and may further include an IC chip 910 and/or a chip connecting member 930. For ease of description, a repeated description of elements identical to those of FIGS. 1 through 5 may be given briefly or omitted.

The display module 100-2 may include the first substrate 110, the second substrate 130 (that faces the first substrate 110), and the touch panel 150 (on the second substrate 130).

The touch panel 150 may be on the second substrate 130 to correspond to or overlie a display area DA. The touch panel 150 may sense a touch made by a touch mechanism such as a pen or a user's finger and may transmit a signal corresponding to the position of the touch to a touch driver (not shown). The touch panel 150 may be used as an input mechanism for the display device 3. The touch panel 150 may use a suitable touch sensing method. For example, the touch panel 150 may sense a touch using various methods including, e.g., capacitive overlap, resistive overlay, infrared beam, integral strain gauge, surface acoustic wave, or piezo electric methods.

The connecting member 950 may have one end that is connected to the touch panel 150 and another end that connected to the touch driver (not shown). The connecting member 950 may deliver a signal corresponding to a touch sensed by the touch panel 150 to the touch driver (not shown). The connecting member 950 may include, e.g., an FPCB.

The window 300 may be on the display module 100-2. For example, the window 300 may be on the touch panel 150 and may include a window body 310 (that faces the display module 100-2) and a light-blocking member 330.

The bonding member 500 may be between the window 300 and the display module 100-2. The bonding member 500 may be between the display area DA of the display module 100-2 and the window 300. In an implementation, a portion of the bonding member 500 may be between a non-display area NDA of the display module 100-2 and the window 300. The bonding member 500 may bond the touch panel 150 of the display module 100-2 and the window 300 together.

The dam member 700 may be between the window 300 and the display module 100-2. The dam member 700 may be placed or may extend along a boundary between the display area DA and a circuit area CA. As illustrated in the drawings, the dam member 700 may overlap or overlie the circuit area CA. In an implementation, a portion of the dam member 700 may overlap or overlie the display area DA. The dam member 700 may be placed or may extend along the boundary between the display area DA and the circuit area CA, and the bonding member 500 (having fluidity) may be prevented from flowing from the display area DA to the circuit area CA.

In an implementation, the dam member 700 may cover at least a portion of the connecting member 950 that is connected to the touch panel 150. For example, the dam member 700 may cover a portion (e.g., an end) of the connecting member 950 that is connected to the touch panel 150. Accordingly, it is possible to effectively prevent the bonding member 500 from flowing from the display area DA to the circuit area CA, e.g., to the connecting member 950. The dam member 700 may include a foam element, and the dam member 700 may function as a buffer. Thus, the dam member 700 may help protect the portion of the connecting member 950 (e.g., the portion that is connected to the touch panel 150) from external impact.

Figure 8:
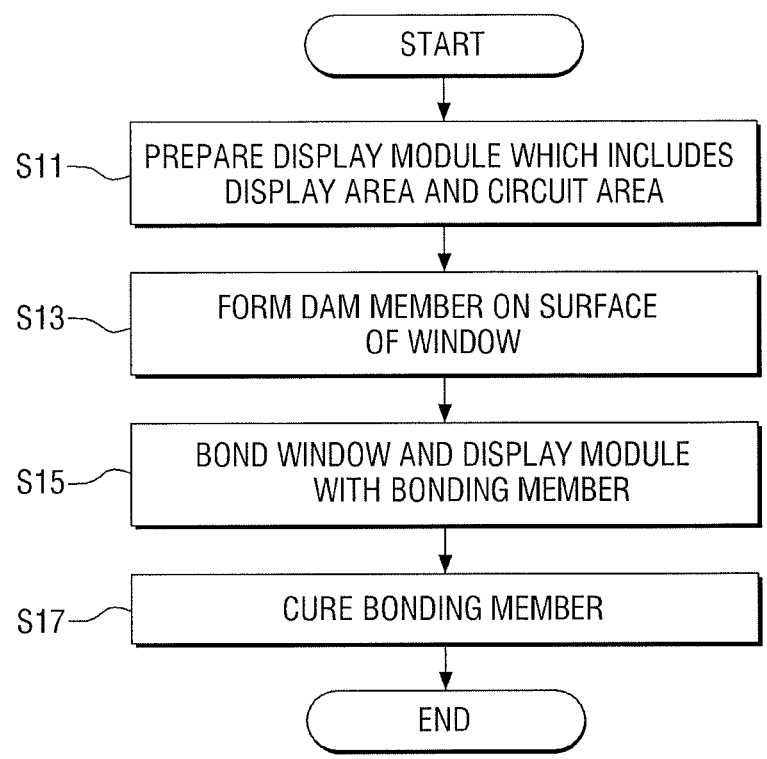
FIG. 8 illustrates a flowchart of a method of manufacturing a display device according to an embodiment.

FIG. 8 illustrates a flowchart of a method of manufacturing a display device according to an embodiment.

Referring to FIG. 8, the method of manufacturing a display device according to an embodiment may include providing or preparing a display module that includes a display area and a circuit area (operation S11), forming a dam member on a portion of a surface of a window that corresponds to or overlies a boundary between the display area and the circuit area (operation S13), bonding the display module and the window together using a bonding member (operation S15), and curing the bonding member (operation S17).

FIGS. 9 through 13 illustrate cross-sectional views of stages in an example of the manufacturing method of FIG. 8. Each operation illustrated in FIG. 8 will now be described in detail with reference to FIGS. 9 through 13.

Figure 9:
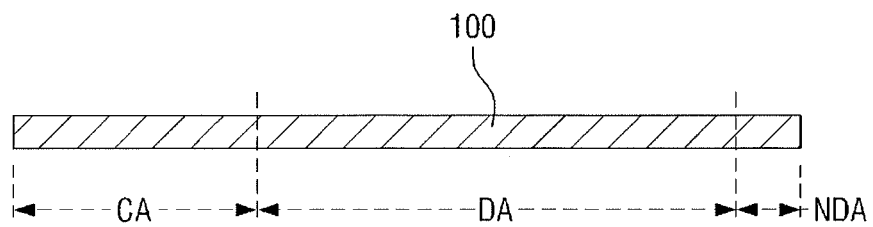
FIGS. 9 through 13 illustrate cross-sectional views of stages in an example of the manufacturing method of FIG. 8.

Referring to FIG. 9, in operation S11, a display module 100 (including a display area DA and a circuit area CA) may be provided or prepared.

Figure 10:
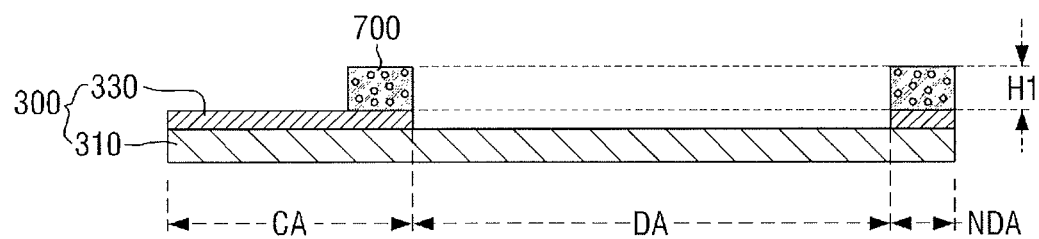

Referring to FIG. 10, in operation S13, a dam member 700 may be formed on a portion of a surface of a window 300 that corresponds to, overlies, or is aligned with a boundary between the display area DA and the circuit area CA of the display module 100. In an implementation, the window 300 may include a window body 310 and a light-blocking member 330, and the dam member 700 may be on the light-blocking member 330.

In an implementation, the dam member 700 may be formed as a foam tape that includes a foam element. In an implementation, forming the dam member 700 may be accomplished simply by attaching the foam tape to the portion of the surface of the window 300 that corresponds to or is aligned with the boundary between the display area DA and the circuit area CA.

In an implementation, the dam member 700 may be formed along edges of the window 300, e.g., along all four side surfaces of the window 300.

The dam member 700 on the surface of the window 300 may have a first height H1 before being coupled to the display module 100.

Figure 11:
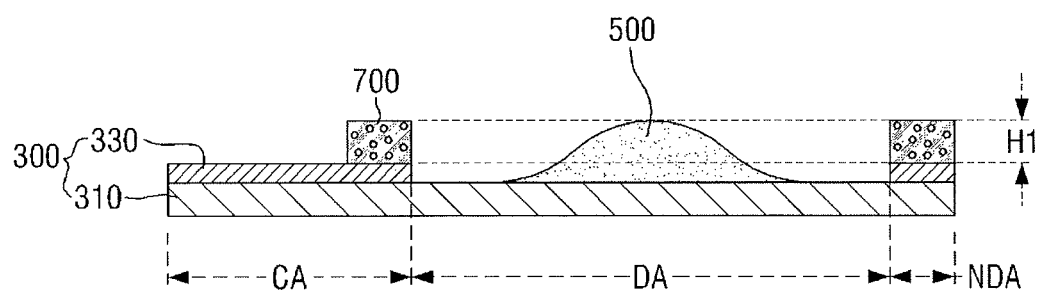

Referring to FIG. 11, in operation S15, a space created on the surface of the window 300 by the dam member 700 may be coated or provided with a bonding member 500. The bonding member 500 may include, e.g., a liquid resin having fluidity. The bonding member 500 may include a resin having light-transmitting properties. In an implementation, the bonding member 500 may include, e.g., a photocurable resin or a thermosetting resin. Other features of the bonding member 500 have been described above with reference to FIGS. 1 and 2, and thus a description thereof may be omitted.

Figure 12:
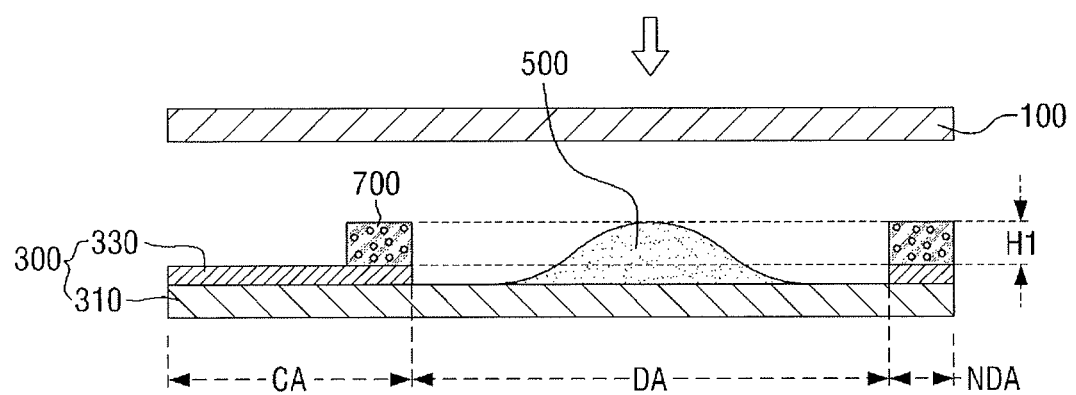

Referring to FIG. 12, the display module 100 may be placed on or over the window 300 to face the surface of the window 300, the dam member 700, and the bonding member 500, and may then be pressed toward the window 300. As the display module 100 is pressed toward the window 300, the bonding member 500 may be spread within the space created by the dam member 700. Accordingly, the window 300 and the display module 100 may be bonded together by the bonding member 500. The dam member 700 may surround edges of the bonding member 500, and the dam member 700 may prevent the bonding member 500 from overflowing as the display module 100 is pressed toward the window 300. In addition, the dam member 700 may be placed or may extend along the boundary between the display area DA and the circuit area CA, and the dam member 700 may prevent the bonding member 500 from flowing to the circuit area CA. Further, the dam member 700 may absorb part of the bonding member 500, and even if the bonding member 500 is supplied in excess, the overflowing of the bonding member 500 can be effectively prevented, and the bonding member 500 may be more effectively prevented from flowing to the circuit area CA.

Figure 13:
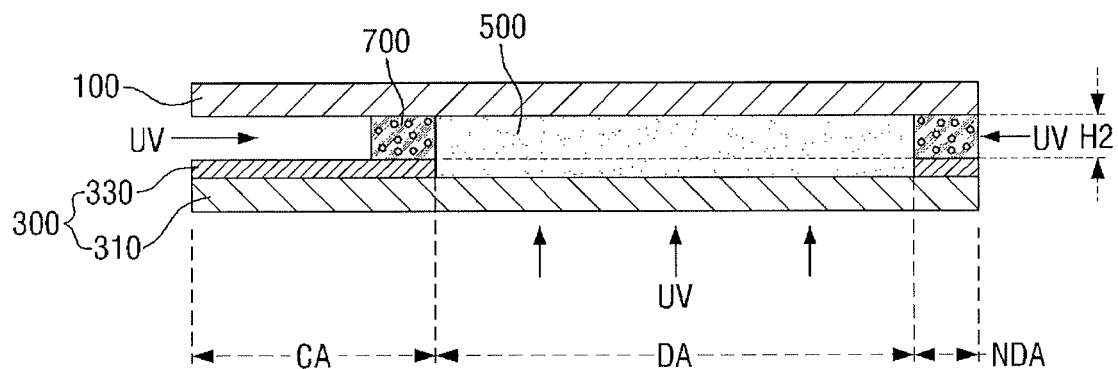

The dam member 700 (including the foam element) may be compressed. Therefore, the dam member 700 may be partially compressed as the display module 100 is pressed toward the window 300. Accordingly, the height of the dam member 700 may be reduced from the first height H1 to a second height H2, as illustrated in FIG. 13. For example, the dam member 700 may be partially compressed in the process of bonding the display module 100 and the window 300, and thus may contact the display module 100 in the compressed state. Therefore, the dam member 700 may more effectively prevent the bonding member 500 from flowing to the circuit area CA.

Referring to FIG. 13, in operation S17, the bonding member 500 may be cured by, e.g., UV light or heat.

If the bonding member 500 is made of or includes, photo-curable resin (e.g., UV resin), it may be cured by UV light. The UV light may be provided from outside of the window 300 as illustrated in FIG. 13. In an implementation, if the dam member 700 is made of or includes a light-transmitting material, the UV light may be provided from outside of or sides of the dam member 700, as illustrated in FIG. 13. In this case, a portion of the bonding member 500 that overlaps the light-blocking member 330 may also be cured more easily.

Figure 14:
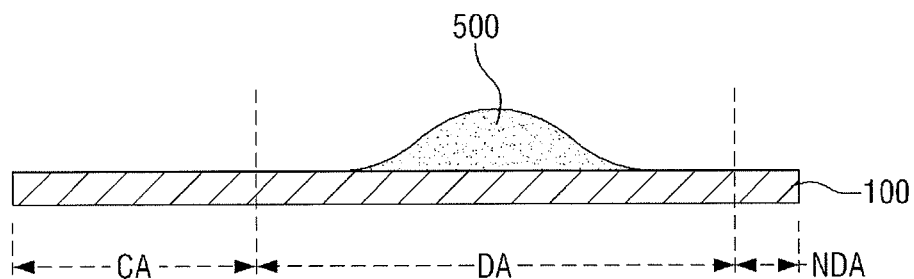
FIGS. 14 through 16 illustrate cross-sectional views of stages in another example of the manufacturing method of FIG. 8.
Figure 15:
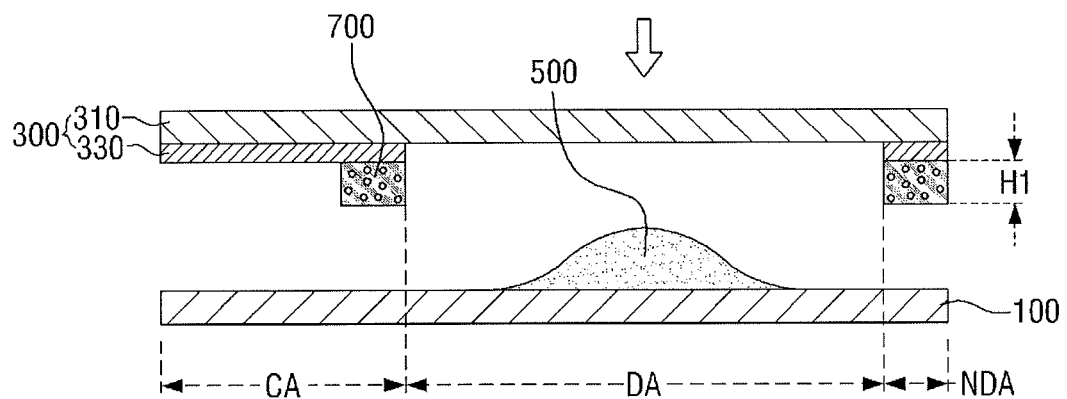
Figure 16:
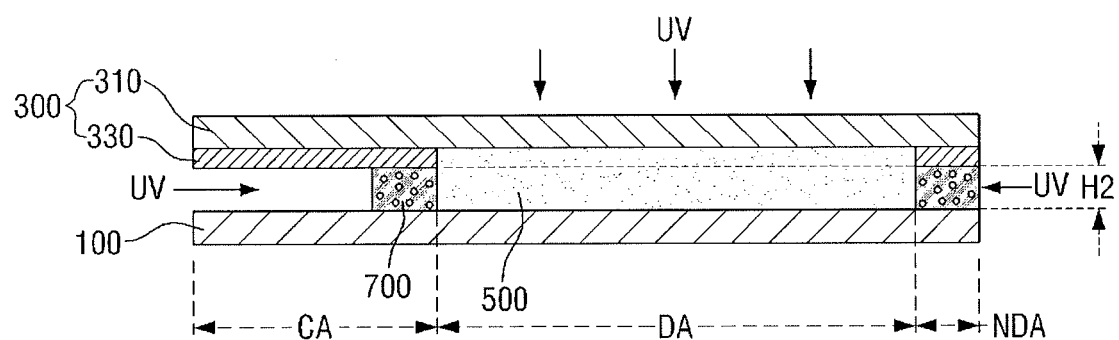

FIGS. 14 through 16 illustrate cross-sectional views of stages in another example of the manufacturing method of FIG. 8. The manufacturing method according to the current embodiment may be the same as the manufacturing method of FIGS. 9 through 13 except for operation S15. Each operation illustrated in FIG. 8 will now be described in detail with reference to FIGS. 14 through 16.

Operations S11 and S13 are the same as those described above with reference to FIGS. 9 and 10.

Referring to FIG. 14, in operation S15, a bonding member 500 may be coated on a display area DA of a display module 100.

Referring to FIG. 15, a window 300 may be placed on or over the display module 100 such that a surface of the window 300 and a dam member 700 face the bonding member 500. Then, the window 300 may be pressed toward the display module 100. As the window 300 is pressed toward the display module 100, the bonding member 500 may be spread in the display area DA and to part of a non-display area NDA. Accordingly, the window 300 and the display module 100 may be bonded together by the bonding member 500.

The dam member 700 may surround edges of the bonding member 500. For example, the dam member 700 may help prevent the bonding member 500 (having fluidity) from overflowing. In addition, the dam member 700 may absorb part of the bonding member 500, and even if the bonding member 500 is supplied in excess, the overflowing of the bonding member 500 may be effectively prevented. Further, the dam member 700 may be placed or may extend along a boundary between the display area DA and a circuit area CA, and the dam member 700 may help prevent the bonding member 500 from flowing to the circuit area CA.

Referring to FIG. 16, in operation S17, the bonding member 500 may be cured by, e.g., UV light or heat. Operation S17 has been described above with reference to FIG. 13, and a description thereof will be omitted.

By way of summation and review, a display device may include a display panel and a window. The window may be bonded to the display panel with a bonding member, e.g., resin. If the resin is not fully cured or is coated in an excessive amount, the resin may overflow, e.g., due to its fluidity.

In an effort to help prevent the overflowing of the resin, forming a dam on edges of the display panel by using resin has been considered. Such a dam may have a non-uniform height or may break.

The embodiments may provide a display device that may help prevent the overflowing of resin.

The embodiments may provide a display device that may be manufactured at a reduced cost and by a simplified process and that may help prevent the overflowing of resin.

Embodiments may provide at least one of the following advantages.

The embodiments may provide a display device that may prevent overflowing of resin.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device, comprising:
a display module including a display area and a circuit area;
a window that faces the display module;
a bonding member between the display area of the display module and the window, the bonding member contacting the display module and the window, and bonding the display module and the window together; and
a dam member along a boundary between the display area and the circuit area, the dam member separating the bonding member and the circuit area,
wherein the bonding member contacts the dam member, and the dam member includes a foam element that absorbs at least a portion of the bonding member.

2. The display device as claimed in claim 1, further comprising an integrated circuit (IC) chip in the circuit area.

3. The display device as claimed in claim 2, wherein the dam member covers at least a portion of the IC chip.

4. The display device as claimed in claim 2, wherein:
the display module includes a first substrate and a second substrate, the second substrate overlying a portion of the first substrate in the display area, and
the IC chip is on a portion of the first substrate in the circuit area.

5. The display device as claimed in claim 1, further comprising a connecting member, the connecting member having a side that is connected to the display module.

6. The display device as claimed in claim 5, wherein the dam member covers the side of the connecting member.

7. The display device as claimed in claim 5, wherein:
the display module includes a display panel and a touch panel, the touch panel being on the display panel, and
the side of the connecting member is connected to the touch panel.

8. The display device as claimed in claim 5, wherein the connecting member includes a flexible printed circuit board.

9. The display device as claimed in claim 1, wherein the dam member is attached to a surface of the window that faces the display module.

10. The display device as claimed in claim 1, wherein:
the dam member is between the display module and the window, and
the dam member extends along side surfaces of the bonding member, the dam member contacting the side surfaces of the bonding member.

11. The display device as claimed in claim 1, wherein the bonding member includes a photocurable resin.

12. The display device as claimed in claim 1, wherein the foam element includes at least one of a polypropylene-based resin, a polyacrylic-based resin, a polyurethane-based resin, or a polyolefin-based resin.

13. A method of manufacturing a display device, the method comprising:
 providing a display module that includes a display area and a circuit area;
 forming a dam member on a portion of a surface of a window such that the dam member extends along a boundary between the display area and the circuit area; and
 bonding the window and the display module together with a bonding member that contacts the dam member, the display module, and the window, the bonding including curing the bonding member,
 wherein the dam member includes a foam element that absorbs at least a portion of the bonding member.

14. The method as claimed in claim 13, wherein forming the dam member includes attaching the foam element to a tape and attaching the tape having the foam element thereon onto the surface of the window at the boundary between the display area and the circuit area.

15. The method as claimed in claim 14, wherein forming the dam member includes attaching the tape to edges of the surface of the window.

16. The method as claimed in claim 13, wherein bonding the window and the display module includes:
 coating a space on the surface of the window with the bonding member, the space being formed by the surface of the window and the dam member;
 placing the display module such that the display module faces the surface of the window and the bonding member; and
 pressing the display module toward the window.

17. The method as claimed in claim 13, wherein bonding the window and the display module includes:
 coating the bonding member on the display area of the display module;
 placing the window such that the surface of the window faces the display module and the bonding member; and
 pressing the window toward the display module.

18. The method as claimed in claim 13, wherein the bonding member includes a photocurable resin.

19. The method as claimed in claim 18, wherein curing the bonding member includes irradiating ultraviolet light to the bonding member.

20. The method as claimed in claim 13, wherein the foam element includes at least one of a polypropylene-based resin, a polyacrylic-based resin, a polyolefin-based resin, or a polyolefin-based resin.

* * * * *